United States Patent [19]

Prietzel et al.

[11] Patent Number: 4,793,721

[45] Date of Patent: Dec. 27, 1988

[54] DEVICE FOR SWITCHING APPARATUS HAVING A SHAFT

[75] Inventors: Günter Prietzel; Ralf Seebold, both of Berlin, Fed. Rep. of Germany

[73] Assignee: Siemens Aktiengesellschaft, München, Fed. Rep. of Germany

[21] Appl. No.: 160,398

[22] Filed: Feb. 25, 1988

Related U.S. Application Data

[63] Continuation of Ser. No. 922,360, Oct. 23, 1986, abandoned.

[30] Foreign Application Priority Data

Nov. 11, 1985 [DE] Fed. Rep. of Germany ....... 3540328

[51] Int. Cl.[4] .............................................. F16C 19/24

[52] U.S. Cl. .................................................... 384/584

[58] Field of Search ............... 384/584, 545, 441, 571, 384/537, 557, 903

[56] References Cited

U.S. PATENT DOCUMENTS

| | | | |
|---|---|---|---|
| 1,444,285 | 2/1923 | Tyden | 384/584 |
| 1,593,474 | 7/1926 | Serrao | 384/545 |
| 3,301,984 | 1/1967 | Wilson | 200/153 |
| 4,512,673 | 4/1985 | Condon et al. | 384/903 |

FOREIGN PATENT DOCUMENTS 1583381 1/1981 United Kingdom .

*Primary Examiner*—Lenard A. Footland

*Attorney, Agent, or Firm*—Kenyon & Kenyon

[57] ABSTRACT

An actuating device for an electric switching apparatus comprises a shaft as well as a tube which contains the bearings of the shaft, for instance, roller cages. The tube has lathe cuts which engage in openings in the walls and is thereby fixed in the axial direction. An alignment tolerance of the openings in the walls does not affect the properties of the bearing adversely.

1 Claim, 1 Drawing Sheet

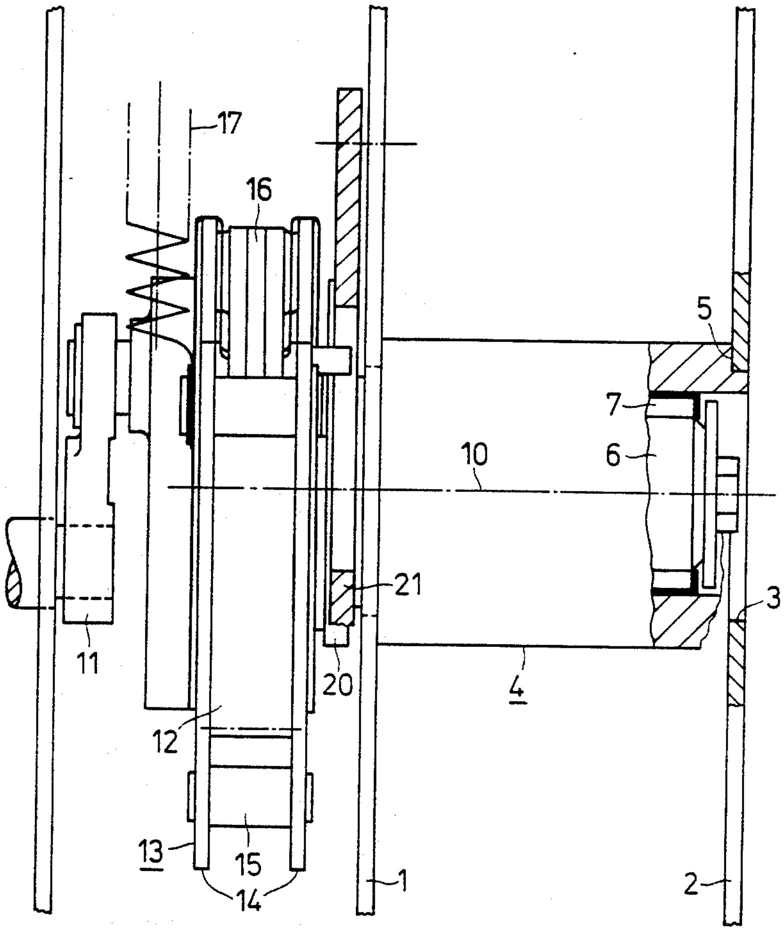
17
16
5
7
10
6
21
3
11
20
4
12
13
15
1
2
14

DEVICE FOR SWITCHING APPARATUS HAVING A SHAFT

This is a continuation of application Ser. No. 922,360 filed Oct. 23, 1986, abandoned.

BACKGROUND OF THE INVENTION

The present invention relates to an actuating device for electric switching apparatus having a shaft and bearings which are arranged at walls consisting of sheet metal at a distance from each other, a tube coaxially surrounding the shaft being arranged between the walls.

An actuating device of this type has become known from British Pat. No. A-1 583,381. In this actuating device, the tube has the purpose of protecting the shaft and of forming a supply space for a lubricant. In spite of its outward simplicity, a bearing arrangement of this type presents considerable problems if it is to be used in quantity production of switch gear, since it is then possible that openings in the walls which are intended to receive the bearings, are not aligned with each other and that accordingly the shaft does not properly cooperate with the bearings or that the shaft cannot be inserted into the bearings as all. This applies particularly to the case where the bearings are not designed as short slide bearing sleeves in view of strong transversal forces at the shaft, so that antifriction bearings are required.

SUMMARY OF THE INVENTION

It is an object of the present invention to eliminate the tolerance problem in bearings of the kind described above in a simple manner.

The above and other objects of the present invention are achieved by an actuating device for an electric switching apparatus having a shaft and bearings which are supported by walls comprising sheet metal spaced at a distance from each other, further comprising a tube coaxially surrounding the shaft arranged between the walls, the bearings being fastened in the tube and the tube being arranged engaging openings in the walls. According to the invention, the tube thereby is given a function different from the known arrangement since it now serves as the actual support of the bearings. It is ensured thereby that the bearings are aligned with each other. Thereby, also high-quality bearings, for instance, roller cages, can be employed. An alignment tolerance of the openings in the walls now manifests itself merely as a deviation of the position of the shaft axis from its normal position, but does not influence the properties of the bearing system in any way.

The tube can be provided at its ends with lathe cuts matched to the openings in the walls. In this manner, a displacement of the tube in the wall and thereby, a displacement of the bearings can be avoided. It has been found particularly if roller cages are used as bearings that the above-described connection of the tube to the walls is sufficient for a fixation since the friction of the shaft in the roller cages is substantially smaller than the friction of the tube in the openings of the walls. Special fitting of the tube ends in the openings of the walls in therefore not necessary.

BRIEF DESCRIPTION OF THE DRAWING

The invention will be explained in greater detail in the following detailed description, referring to the embodiment of the device for a switching apparatus shown in the drawing FIGURE.

DETAILED DESCRIPTION

The FIGURE shows two walls 1 and 2 arranged parallel at a spacing form each other, which may be partitions of the housing of a low-voltage circuit breaker. The walls 1 and 2 are provided with openings, of which one opening 3 of the side wall 2 is shown. Between the walls 1 and 2, a tube 4 is arranged which is set back at its ends by lathe cuts 5. Thereby, the tube 4 is fixed in the axial direction between the walls 1 and 2. For supporting a shaft 6, the tube 4 contains one or more roller cages 7, for instance, needle bearing cages. By accommodating these roller cages in the tube 4, proper support of the shaft 6 is ensured independently of a position of the tube 4 between the walls 1 and 2. An alignment tolerance of the openings of the walls 1 and 2 can therefore cause only a deviation of the longitudinal axis 10 of the bearing from the normal position but does not affect the bearing system itself.

The shaft 6 serves for tensioning a spring by means of a crank arm 11 which is fastened to the wheel body of a ratchet wheel 12. A cage 13 which is formed by plates 14 and connecting bolts 15 is supported next to the teeth at the wheel body of the ratchet wheel 12 and serves as the carrier of a transport ratchet 16 which continues to turn the ratchet wheel 12 step-wise in the same direction if the cage 13 rotates alternatingly forward and back. For resetting the cage 13 to its starting position after every stroke a return spring 17 is provided which engages the cage 13 or an extension fastened thereto. For latching the spring engaging the crank arm 11 in the tensioned position, a cam wheel 20 connected to the ratchet wheel 12 is provided which is located between the ratchet wheel 12 and the wall 1, as well as a blocking lever 21.

Showing further parts of the actuating device can be dispensed with since they are not necessary for an understanding of the bearing arrangement so that reference can be made to known actuating devices to that extent. Further details can therrefore be seen, for instance, in British Pat. No. A-1 583,381 or U.S. Pat. No. 3,301,984.

In the foregoing specification, the invention has been described with reference to a specific exemplary embodiment thereof. It will, however, be evident that various modifications and changes may be made thereunto without departing from the broader spirit and scope of the invention as set forth in the appeded claims. The specification and drawings are, accordingly, to be regarded in an illustrative rather than restrictive sense.

What is claimed is:

1. An actuating device for circuit breaking elements of a circuit breaker, comprising a housing comprised of sheet metal and an actuating mechanism, said actuating mechanism comprising an actuating shaft, a tube which coaxially surrounds the actuating shaft for retaining the shaft between two prallel walls of the housing, the tube being mounted at ends thereof in respective holes in each of the walls of the housing, further having cuts which match cuts in the housing walls, thereby allowing the tube to be supported in the housing against axial movement, the actuating mechanism further comprising bearings disposed within the tube for allowing the shaft to rotate in the tube, said bearing comprising roller cage bearings.

* * * * *